Dec. 10, 1946.  C. J. YOUNG  2,412,310
SIGNAL RECORDING SYSTEM
Filed July 31, 1942  2 Sheets-Sheet 2

Inventor
Charles J. Young
By
C. D. Tuska
Attorney

Patented Dec. 10, 1946

2,412,310

UNITED STATES PATENT OFFICE 2,412,310

SIGNAL RECORDING SYSTEM

Charles J. Young, Ardmore, Pa., assignor to Radio Corporation of America, a corporation of Delaware Application July 31, 1942, Serial No. 453,121

4 Claims. (Cl. 250—20)

This invention relates to radio receivers, and more particularly to a system for providing a continuous visible indication and record of the presence and character of radio signals throughout a band of frequencies.

One type of panoramic receiver system employs a control wave generator, a radio receiver with a reactance tube or similar means for cyclically varying the tuning over a range in response to the control voltage, and a cathode ray tube connected to sweep along one coordinate in response to the control voltage and to deflect at right angles thereto in response to receiver output. The resulting pattern on the cathode ray tube screen is a visual indication of the frequencies and amplitudes of any signals picked up within the tuning sweep band.

A disadvantage of this system lies in the fact that the operator must constantly center his attention on watching the screen. Also, while some information as to the nature of the transmission may be obtained by careful observation of the pattern, it is not possible to learn as much as may be desired about some of the signals appearing on the screen.

Accordingly, it is proposed to provide an improved system for recording continuously the frequency and time of occurrence of the received signals, as well as giving a continuous indication of the approximate signal strengths and the types of transmission. This is done by combining a facsimile recorder with a receiver of the type described above, in such relationship as to give a maximum of useful information.

The principal object of the invention is to provide an improved method of and means for frequency indicated radio reception.

Another object is to provide an improved method of and means for recording during any desired period the time and nature of signals appearing within a particular frequency band.

Figure 1:
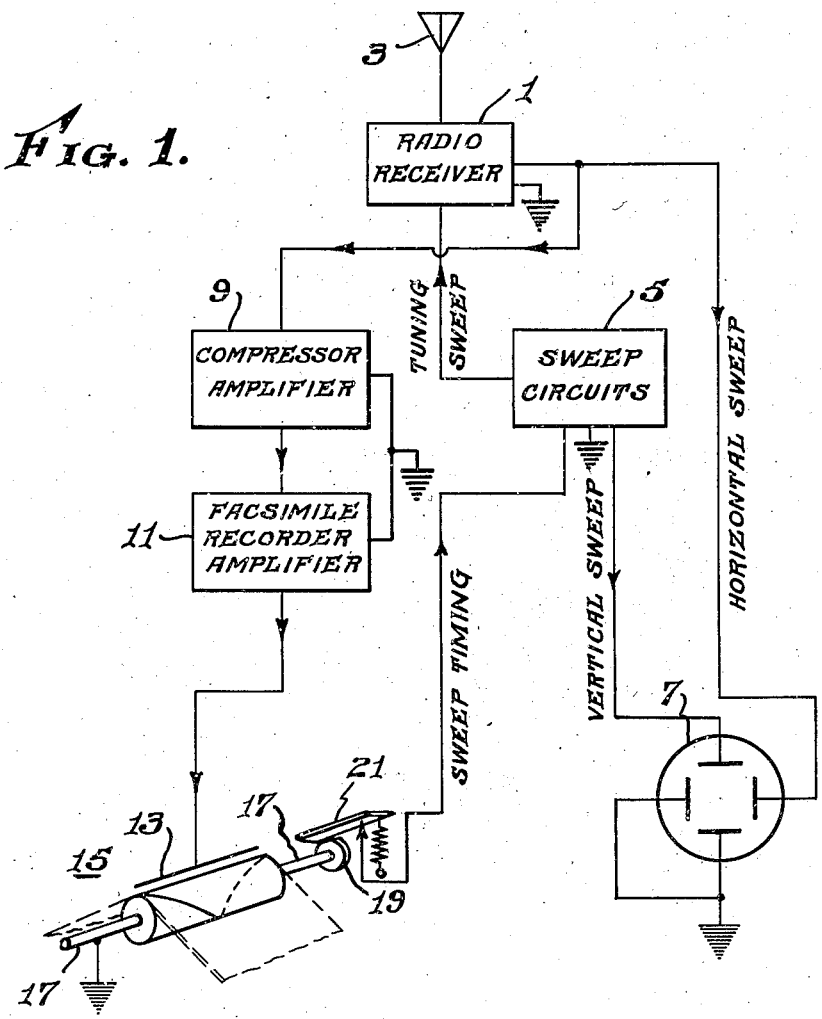
Figure 2:
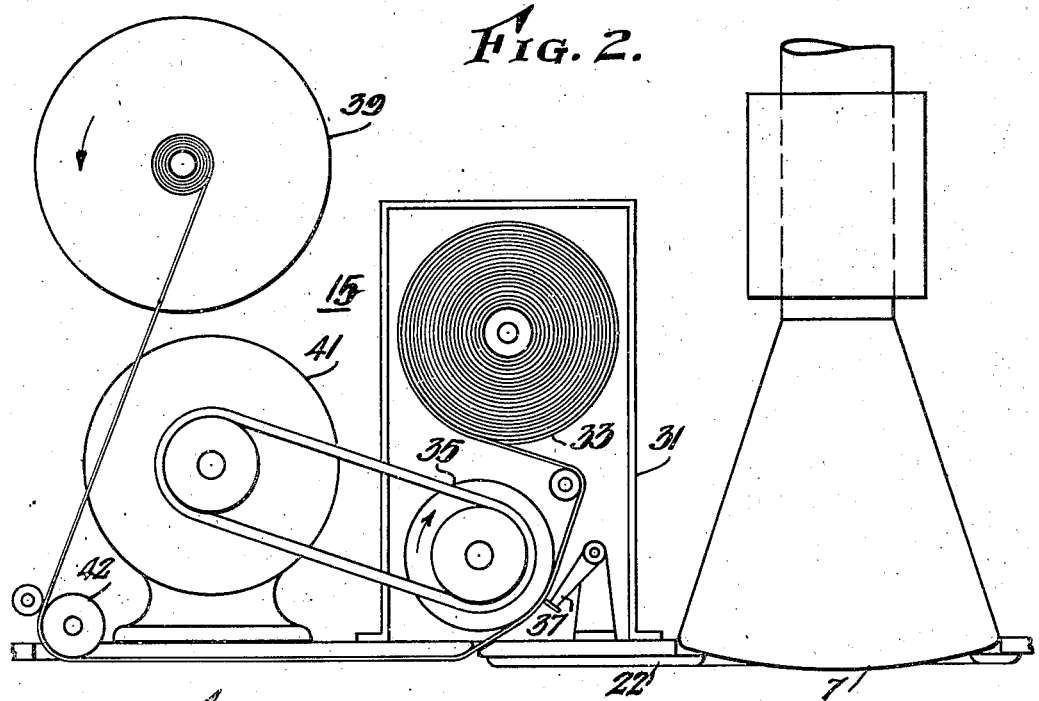
Figure 3:
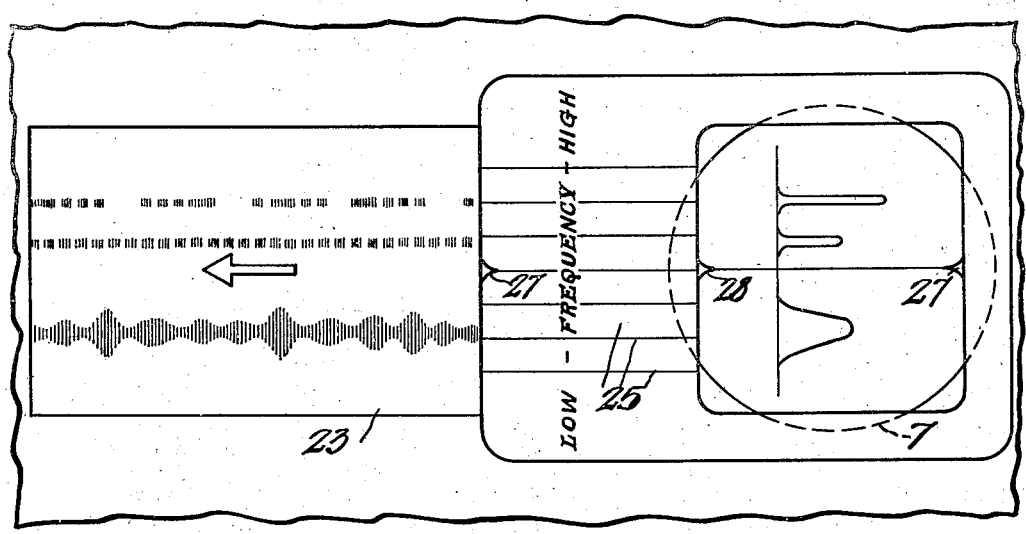

These and other and incidental objects will become apparent to those skilled in the art upon consideration of the following description, with reference to the accompanying drawings, in which Figure 1 is a schematic block diagram of an embodiment of the invention, Figure 2 is a plan view showing the internal arrangement of a device constructed according to the invention, showing typical indications, and Figure 3 is an elevation of the front panel of the device.

Similar reference characters are applied to similar elements in the drawings.

Referring to Fig. 1, the system comprises a radio receiver 1 connected to an antenna 3 and to a sweep voltage generator 5, which may be of the type described in U. S. Patent No. 2,157,434 to J. L. Potter. The receiver 1 includes a reactance tube or other device for varying its tuning in response to the voltage provided by the sweep generator.

The output circuit of the receiver 1 is connected to the horizontal deflection circuit of a cathode ray tube 7, and to the input of a compressor amplifier 9. The output of the compressor 9 goes through an amplifier 11 to the printer bar 13 of a facsimile recorder 15, which may be of the type described in application Serial No. 420,917, filed November 29, 1941, by C. J. Young. The helix shaft 17 of the recorder 13 is provided with a cam 19 arranged to operate a switch 21 in the synchronizing circuit of the generator 5. The vertical deflection circuit of the tube 7 is connected to the output of the sweep generator 5. A suitable motor 41 (see Fig. 2) is arranged to drive the helix shaft 17 at constant speed.

In operation, the rotation of the shaft 17 causes the cam 19 to operate the switch 21 once each revolution, initiating a sweep voltage cycle in the generator 5. The beam of the cathode ray tube 7 is accordingly deflected to produce a vertical tract on the fluorescent screen. At the same time, the tuning of the radio receiver 1 is swept through a predetermined band of frequencies. Any signal within this band picked up by the antenna 3 and detected in the receiver 1 will produce a pulse in the receiver output at a specific time during the sweep cycle which is directly related to the frequency. This will cause a horizontal deflection of the cathode ray beam at a corresponding point along the vertical tract.

The receiver output pulses are also applied to the compressor amplifier 9, in which their amplitudes, which may be widely different, are reduced and brought within a common and predetermined range. The output of the compressor 9 is amplified by the amplifier 11 and applied to the printer bar 13, producing a mark on the paper at the point along its width determined by the intersection of the printer bar and the helix, which in turn corresponds to the signal frequency. As the sweep cycle is relatively rapid, 60 cycles per second, for example, the cathode ray image is retraced frequently enough to appear as a line, and successive marks on the facsimile record are close enough together to appear continuous for a distance corresponding to the duration of the signal.

The physical arrangement of the cathode ray tube and the recorder is shown in Figs. 2 and 3. The cathode ray tube 7 is positioned behind a panel 22 provided with a rectangular opening through which the face of the tube 7 may be observed.

The arrangement of the apparatus behind the panel is shown in Fig. 2. The recorder is preferably of the electrolytic type, to allow high speed operation. A moisture-tight box 31 encloses the roll 33 of sensitized paper, the helix drum 35, and the printer bar 37. The paper is drawn from the roll 33, past the printer, and through a slot arranged so as to be sealed by the paper itself. The record travels across the front of the mechanism, as described above, and then through a second slot to a storage roll 39. A motor 41 is provided to drive the drum 35 and, through gear reductions not shown, to turn the paper feed roll 42, and the core of roll 39.

The record 23 (Fig. 3) is drawn horizontally across the front of the mechanism so that the marks thereon are in alignment with the corresponding deflections on the cathode ray tube. A series of horizontal lines 25 are engraved or otherwise marked on the panel 22, in order to guide the eye from the indications on the screen to the corresponding indications on the record. Indices 27, 28 and 29 are provided to show the point corresponding to the center of the frequency band being swept.

A typical group of signal representations appears in Fig. 3. The frequencies are indicated by the positions vertically on the cathode ray screen, and transversely of the record 23. The amplitudes are shown by the extent of the horizontal deflections on the cathode ray tube. The time of arrival is determined by the position of the trace along the length of the record.

The upper trace on the facsimile record illustrates a relatively slow C.-W. signal. The second trace is a series of dots sent by an automatically keyed transmitter. The lower trace is the result of a modulated signal; the changes in width correspond to the variations in modulation depth, not to the individual modulation cycles.

Thus the invention has been described as an improved signal recording system. A facsimile recorder and a cathode ray tube are actuated by a panoramic receiver to provide easily interpretable indications of the amplitude, frequency, relative time of arrival, and type of signals received within a predetermined band of frequencies. A permanent record of the received signals is also provided.

I claim as my invention:

1. A signal recording system comprising a radio receiver including voltage responsive tuning means, a cathode ray tube provided with deflection circuits and a fluorescent screen, and a facsimile recorder, a sweep voltage generator controlled by said facsimile recorder to operate synchronously with the scanning thereof, connections from said sweep voltage generator to one deflection circuit of said cathode ray tube and to said voltage responsive tuning means in said radio receiver, whereby the frequency of response of said receiver is cyclically varied over a predetermined range synchronously with the scanning of said facsimile recorder and the sweep of the beam of said cathode ray tube, and means for applying the output of said receiver to a second deflection circuit of said cathode ray tube and to the printer bar of said facsimile recorder.

2. A signal recording system including a radio receiver, a facsimile recorder, a source of cyclically varying voltage controlled in frequency by said facsimile recorder, means responsive to said voltage to vary the tuning of said radio receiver, and means arranged to actuate said recorder in response to the output of said receiver.

3. A signal recording system including a radio receiver, means for cyclically varying the tuning of said receiver, a cathode ray tube provided with deflection circuits and a fluorescent screen and a facsimile recorder connected to respond to the output of said receiver and arranged so that indications appearing on the record medium of said facsimile recorder in response to said receiver output are disposed in alignment with corresponding indications on the screen of said cathode ray tube, and a plurality of parallel indices positioned between said record medium and said screen.

4. A signal recording system including a radio receiver, a cathode ray tube provided with deflection circuits and a fluorescent screen, and a facsimile recorder, means for varying the tuning of said radio receiver, means for actuating said cathode ray tube in response to the output of said receiver so as to provide visual indications of the amplitudes and frequencies of signals received by said receiver, and means for actuating said recorder in response to the output of said receiver so as to provide permanent visual records of the frequencies, relative time of arrival, and character of modulation of said signals, said recorder and said cathode ray tube being so positioned that said indications and said records are aligned.

CHARLES J. YOUNG.